United States Patent [19]
Janssen

[11] 3,868,852
[45] Mar. 4, 1975

[54] VOLUME GAS METER
[75] Inventor: Sylvain Janssen, Paris, France
[73] Assignee: Compteurs Schlumberger, Hauts de Seine, France
[22] Filed: May 18, 1973
[21] Appl. No.: 361,693

[30] Foreign Application Priority Data
May 19, 1972 France .............................. 72.18005

[52] U.S. Cl. ................................................. 73/233
[51] Int. Cl. ............................................. G01f 1/02
[58] Field of Search .............. 73/233, 227, 230, 497

[56] References Cited
UNITED STATES PATENTS
2,668,944 2/1954 Schwyn et al. .................... 73/497 X FOREIGN PATENTS OR APPLICATIONS
904,190   10/1945   France ................................. 73/233
922,976   6/1947    France ................................. 73/233
642,491   8/1928    France ................................. 73/233
684,733   6/1930    France ................................. 73/233
1,033,395 4/1902    France ................................. 73/233
927,834   5/1955    Germany ............................. 73/233
2,009,012 9/1971    Germany ............................. 73/233

Primary Examiner—Jerry W. Myracle
Attorney, Agent, or Firm—William R. Sherman; Jean-Yves Monod

[57] ABSTRACT

A temperature correction device for a volume gas meter comprises a first shaft which rotates at a first speed proportional to the volume flow rate of gas. A magnetic slip clutch couples the first shaft to a second shaft and a magnetic brake develops a torque on the second shaft. The magnetic slip clutch and the magnetic brake each comprise a non-ferromagnetic metal disk and at least one permanent magnet with thermomagnetic shunts. The resistivities of the disks and the thermomagnetic shunts are chosen such that the ratio of the second speed to the first speed varies as a function of the temperature according to a law which is reverse of that of the variation of the volume of the gas. A totalizer is coupled to the second shaft and gives an indication of the volume which is independent of the temperature. The temperature correction device is enclosed in an envelope which communicates with the gas to be measured. In a second embodiment, the two non-ferromagnetic metal disks are combined to constitute a single disk made of two different materials or of the same material.

19 Claims, 3 Drawing Figures

VOLUME GAS METER

BACKGROUND OF THE INVENTION

This invention relates to a device allowing the correction of the indications of a gaseous fluid meter when the temperature of this fluid varies.

It is known that the majority of domestic gas meters are of the positive displacement type, i.e. their cyclic speed is, at a determined instant, proportional to the volume flow rate of the gas going through them. The purpose of billing is to obtain the payment of a given number of latent calories at a given unit price.

As the calorific value is defined by a determined mass of gas, it is understood that an increase in the temperature of the gas has the effect of furnishing the consumer with a volume having a lower energy content, the density of the gas decreasing by about 1/273 per degree centigrade.

The tendency to install meters outside of temperature-controlled housing areas can thus lead to the establishment of bills which do not have the desired correlation with the amount of calories actually consumed by the client. For example, a meter installed out of doors and exposed to winter temperatures of −20°C will bill the unit of heat quantity at a price about 13 percent lower than at 15°C, whereas, in summer, the price which the consumer pays for the unit of heat quantity is 10 percent higher than that paid for gas delivered at 15°C if his meter is fully exposed to the sun.

Various solutions have already been proposed for performing such a correction. These solutions generally use a probe containing a variable volume of sample gas brought to the same temperatures as the gas to be measured: the variations in the volume of the sample gas are then processed by means of a complex mechanical transmission to act on a mechanism associated with the output shaft of the meter and thereby modify the rotating speed of the meter in order to obtain the desired temperature compensation. Devices of this type have the drawback of using mechanical elements such as levers, linkages, gears, differentials, and so on, which are subject to wear and involve delicate adjustments.

Other electronic-type solutions use the conversion of the physical magnitudes of flow rate and temperature into electric signals which are applied to an electronic circuit performing the desired flow rate correction. These devices require an electric power supply and are also costly and not highly reliable.

It is an object of the invention to provide for instantaneous correction of the volume flow rate indications furnished by the gas meter so as to total only gas volumes related to normal temperature conditions.

It is a further object to provide a device performing the correction of the volume flow rate in accordance with the variations in the temperature of the gas to be measured within a chosen operating temperature interval, and not having the abovementioned drawbacks of the prior art.

SUMMARY OF THE INVENTION

According to the invention, a device is provided for correcting the indications of a gas meter the output shaft speed of which is proportional to the volume flow rate of the gas. The device of the invention comprises:
— a variable-slide magnetic drive device keyed on the output shaft of the meter and made up of at least one permanent magnet and a part of revolution made of non-ferromagnetic metal, separate from said magnet but placed in its field;
— a rotary moving element keyed on the output of said magnetic drive device;
— an eddy-current brake, equipped with at least one permanent magnet exercising a braking torque on said moving element; and
— a totalizing clock mechanism driven by said moving element;

said magnetic drive device and eddy-current brake being placed at the same temperature as that of the gas to be measured, and the resistivity of said metallic part of revolution and/or the temperature coefficients of the magnets of the magnetic drive and of the eddy-current brake being chosen to produce a slide such that the ratio of the moving-element speed to the speed of the output shaft of the meter is inversely proportional to the absolute temperature of the gas to be measured.

Thus, the metallic part of revolution of the magnetic drive device acts as a temperature probe in association with its magnet and that of the eddy-current brake, and establishes between the speeds of the meter shaft and the moving-element shaft a slide varying with temperature.

The invention provides for various embodiments depending on whether the braking of the eddy-current brake is exercised on the same metallic part as that of the magnetic drive device or on a distinct metallic part. It is also possible to modify both the resistivity of the metallic parts of the magnetic drive and of the eddy-current brake and the temperature coefficients of the associated magnets to obtain the desired relationship between the input and output speeds.

The device according to the invention thus offers advantages of design and application simplicity: absence of external energy source, transmission of movement without contact between the shaft of the meter and the correcting device, components in rotary movement only, and so forth.

Before describing in greater detail an embodiment of the invention, and in order to allow a better understanding of the invention, let us review the theoretical foundation on which the principle of the invention is based:

a. It is known that the electric resistivitiy $\rho$ of a pure metal, for example copper or aluminum, follows a linear law of the following form:
$$\rho = \rho_o (1 + kt)$$
where
$\rho_o$ designates the resistivity of the metal at 0°C
$t$ the temperature of the metal in degrees C
$k$ a temperature coefficient whose value is very close to 1/273 (or about 3.6. $10^{-3}$ /°C)
which can also be written:
$$\rho \approx \rho_o \cdot (T/273) \quad (1)$$

b. The specific volume of a gas near the perfect state is also a linear function of temperature $t$, of the form
$$v = v_o (1 + \alpha t)$$
where
$v_o$ designates the gas volume at 0°C
$\alpha$ the coefficient of volume increase at constant pressure whose value is very close to 1/273,
which can also be written:
$$v = v_o \cdot (T/273) \quad (2)$$

c. A magnetic field mobile in space, coming for example from one or more permanent magnets, rotating around an axis at an angular speed $\omega_1$ and and acting on a metallic disk at rest having an electric resistivity $\rho_1$ and a relative permeability equal to 1 in relation to vacuum subjects the disk to a driving torque $C_1$ such that:

$$C_1 = k_1 (\phi_1^2/\rho_1) \omega_1 \qquad (3)$$

where $\phi_1$ designates the flux from the mobile magnets cut at a given instant by the disk, $k_1$ is a positive constant depending only on the geometry of the disk.

d. Finally, the braking forces exerted on a metallic disk having a resistivity $\rho_2$ and a relative permeability equal to 1, mounted on a shaft rotating at the speed $\omega_2$ and cutting a magnetic induction flux $\phi_2$ at a given instant, results in a resistant torque $$C_2 = k_2 (\phi_2^2/\rho_2) \omega_2 \qquad (4)$$

where $k_2$ is a negative constant depending only on the geometry of the mobile disk.

Having reviewed this, the simultaneous utilization of these properties in the device to be described here and which is associated with a gas meter, makes it possible to obtain the correction of the indications of this meter in accordance with temperature.

BRIEF DESCRIPTION OF THE DRAWING

The appended drawing represents, by way of example, various embodiments of the invention. In this drawing.

DESCRIPTION OF ILLUSTRATIVE EMBODIMENTS

Figure 1:
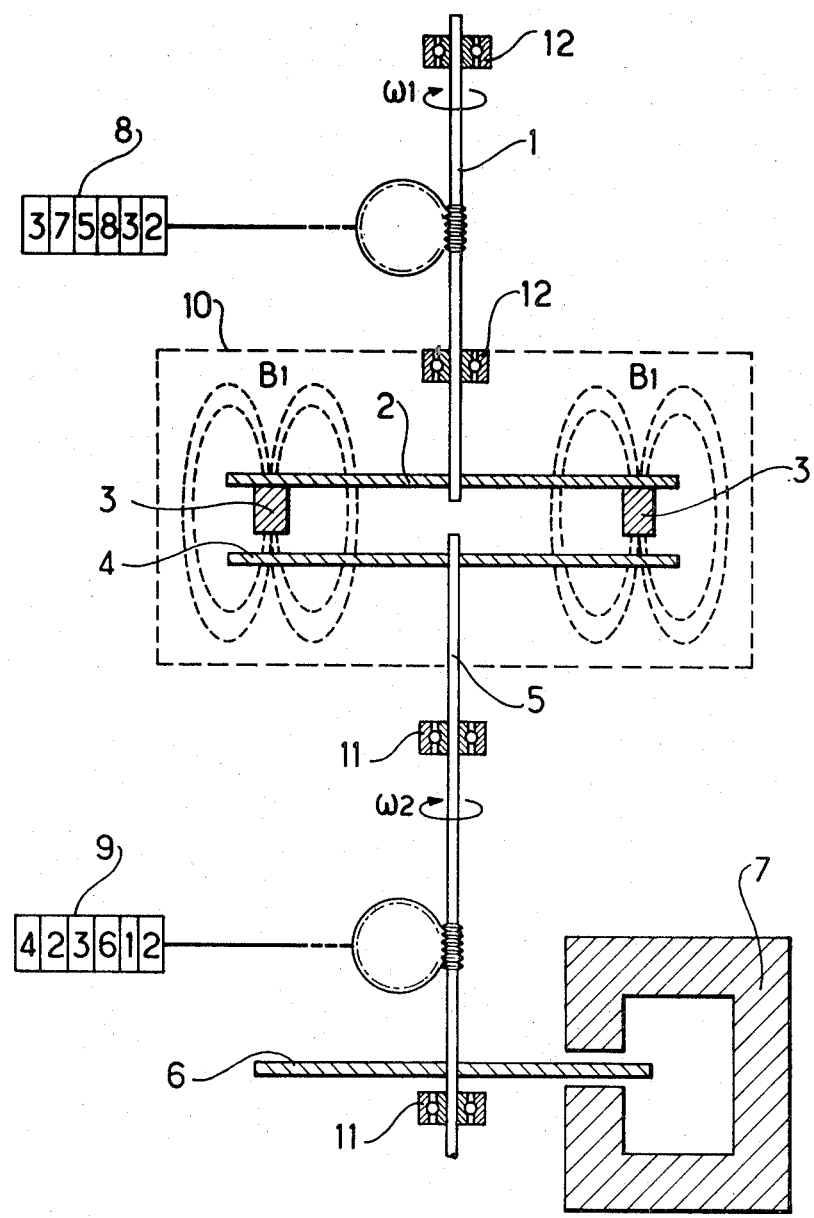
FIG. 1 is a schematic diagram of a device according to the invention.

In FIG. 1 is seen the output shaft 1 of a gas meter (not shown) rotating at an angular speed $\omega_1$ proportional to the volume flow rate, which drives a mechanical totalizer 8 furnishing indications on the volumetric metering uncorrected for temperature. According to the invention, on the shaft 1 is mounted a part 2, for example in the form of a disk, which forms part of a magnetic drive device 10 and carries a set of permanent magnets 3 arranged symmetrically. The elements 2 and 3 cooperate with another non-ferromagnetic part of revolution 4 in the form of a disk. This disk 4 is mounted at the end of a moving element coaxial with the shaft 1 placed at the same temperature as that of the gas to be metered, and whose shaft 5, mounted in bearings 11, can be rotated by means of the drive device 10.

The moving element also includes a metallic disk 6, integral with the shaft 5, capable of rotating in the gap of a fixed permanent magnet 7. It drives another mechanical totalizer 9 which furnishes metering indications corrected as a function of temperature.

The magnets 3 develop in space a magnetic induction field $B_1$, shown schematically in the figure by curved lines (broken lines) issuing from the holes. Designating by $\rho_1$ the resistivity of the disk 4, the shaft 5 of the moving element is subjected, at rest, under the effect of the rotating field $B_1$ to a drive torque $$C_1 = k_1 (\phi_1^2/\rho_1) \omega_1$$

$\phi_1$ designating the magnetic flux cut by the disk 4 according to the previously-indicated formula (3) and the moving element takes on an angular speed $\omega_2$. The drive torque thus becomes:

$$C_m = k_1 (\phi_1^2/\rho_1) (\omega_1 - \omega_2)$$

Moreover, the braking exercised on the disk 6 produces an opposing torque $$C_f = k_2 (\phi_2^2/\rho_2) \omega_2$$

according to the preceding formula 4.

Finally, the steady state is reached when $C_m = C_F = 0$, so that $$k_1 (\phi_1^2/\rho_1) (\omega_1 - \omega_2) = -k_2 (\phi_2^2/\rho_2) \omega_2 \quad (k_2 \quad 0)$$

and $$\omega_2 = \omega_1 \frac{1}{1 + \dfrac{-k_2 \Phi_2^2}{\dfrac{\rho_2}{\dfrac{k_1 \Phi_1^2}{\rho_1}}}}$$

By making arrangements so that $k_2 \phi_2^2/\rho_2$ is very large compared with $k_1\phi_1^2/\rho_1$, i.e., by performing the effective braking of the moving element by means of the elements 6 and 7, the preceding expression can be written:

$$\omega_2 = \omega_1 (k_1/k_2) (\phi_1/\phi_2)^2 (\rho_2/\rho_1) \qquad (5)$$

In this form, it is seen that this expression can be used in several ways:

a. A first solution consists of choosing, for the disk 4, a metal whose resistivity follows the previously-mentioned relationship (1)

$$\rho = \rho_o (1 = kt) = \rho_o T/273$$

as closely as possible, as is the case for example of a certain number of usual metals, such as:

aluminum: $k = 3.9 \cdot 10^{-3}$ /°C
copper: $k = 3.8 \cdot 10^{-3}$ /°C
zinc: $k = 3.7 \cdot 10^{-3}$ /°C
etc...

By equipping the magnets 3 and 7 with suitable thermomagnetic shunts so as to cancel their temperature coefficient as is usually done in disk-type electricity meters (these magnetic shunts being chosen in special steels with a variable temperature coefficient), the terms $\phi_1$ and $\phi_2^2/\rho_2$ can be made independent of temperature, so that the formula (5) is written:

$$\omega_2 = K\omega_1 (l/\rho_1) = K\omega_1 (l/T)$$

where $K$ is a constant. The speed $\omega_2$ is thus substantially proportional to the volume flow rate corrected for temperature according to the formula (2).

b. Another solution consists of making the eddy-current brake act on the same disk as that of the magnetic drive. Under these conditions, the resistivities $\rho_1 = \rho_2$ are eliminated from the formula (5), and we have:

$$\omega_2 = K\omega_1 (\phi_1/\phi_2)^2$$

To make $\omega_2$ proportional to $1/T$, several means are possible:

— to make $\phi_2$ constant and $\phi_1^2$ proportional to $1/T$
— or to make $\phi_1$ constant and $\phi_2^2$ proportional to $T$
— or to make $(\phi_1/\phi_2)^2$ proportional to $1/T$.

Practically, these different results are obtained by equipping the magnets 3 and 7 with suitably adapted thermomagnetic shunts so that the resultant fluxes follow the desired relationship in accordance with temperature.

Examples will make it possible to better understand how the relationship (5) can be satisfied, the aim being to obtain a correction term as a function of temperature such that:

$$1/(1 + 3.6 \cdot 10^{-3} \cdot t) \quad (t \text{ in degrees centigrade}).$$

1. We take a magnetic driving disk 4 in ordinary aluminum of any purity whose resistivity has a temperature coefficient of about $4.2 \cdot 10^{-3}$ /°C. It is thus necessary for the resistivity of the braking disk 6 to introduce a correction of $0.6 \cdot 10^{-3}$ /°C, this term intervening in the numerator of the formula (5). For the disk 6, we use a material such as nickel silver, an aluminum or beryllium bronze, or a duralumin whose resistivity has a temperature coefficient of about $(0.6 \cdot 10^{-3})$ /°C, so that the correcting term is written $$(1 + 0.6 \cdot 10^{-3 \cdot t})/(1 + 4.2 \cdot 10^{-3 \cdot t}) \sim 1/(1 + 3.6 \cdot 10^{-3} t)$$

Magnets in ticonal for example, having a temperature coefficient of the order of $-2.10^{-4}$ /°C, can easily furnish fluxes independent of temperature by means of suitable thermomagnetic shunts.

2. We take disks 4 and 6 in a same material, or a single disk. Ferrites acting as a driving magnet have a temperature coefficient of the order of $-20 \cdot 10^{-4}$ /°C, or for the correcting term of $\phi_1$:

$$(1 - 2.10^{-3}t)^2 \sim (1 - 4.10^{-3}) \cdot t \sim 1/(1 + 4.10^{-3} \cdot t)$$

It is then sufficient to equip the braking magnet with a thermomagnetic shunt adjusted to cover only one fraction, for example 5 to 10 percent of the total flux coming from the magnet, and thereby adjust the correction coefficient at a value very close to $$1/(1 + 3.6 \cdot 10^{-3} t)$$

As thermomagnetic shunts, it is possible to use cupronickels or ferro-nickels, for example those known under the commercial name of Thermoperm, T.65, etc.

Figure 2:
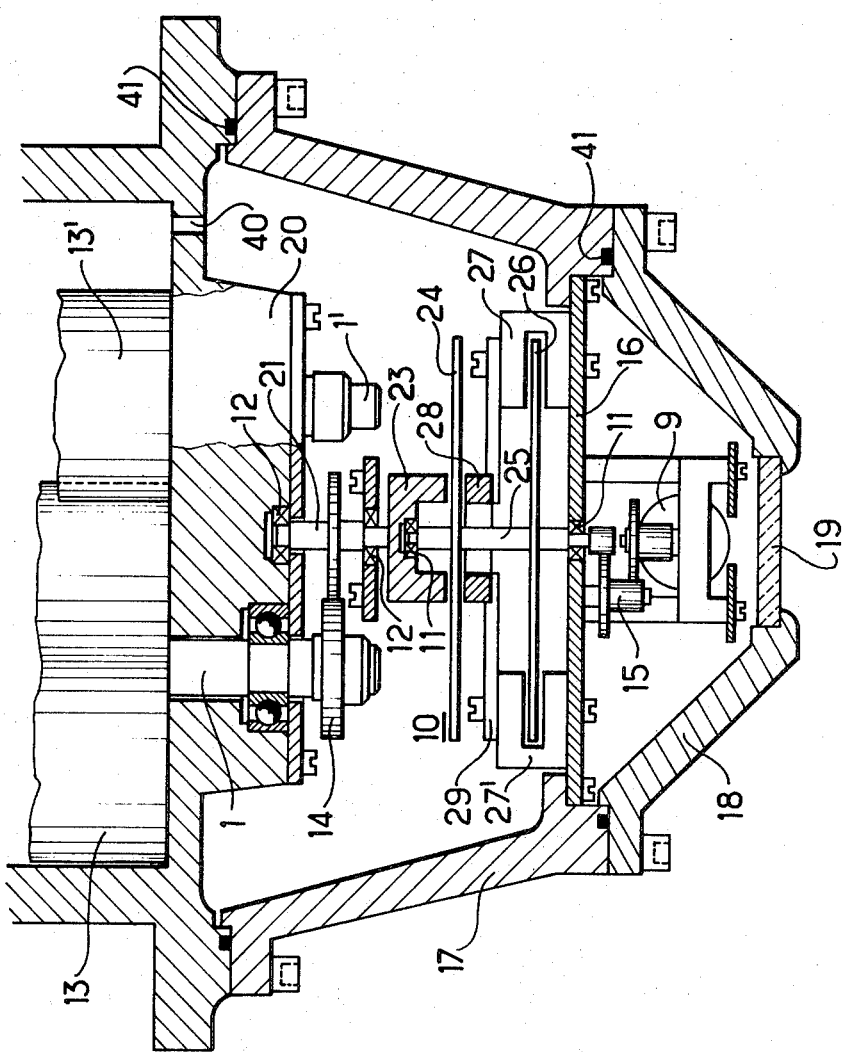
FIGS. 2 and 3 represent two practical embodiments of such a device mounted on a gas meter.

FIG. 2 represents an example of the application of the invention to a gas meter of the rotary piston type, although the particular kind of meter is immaterial with regard to the invention and can be of any type, for example of the bellows, turbine, etc. type as long as it has an output shaft.

In the top view shown in FIG. 2, the numeral 20 designates one of the side plates of the meter in which the shafts 1, 1' of the two pistons 13, 13' run, the shaft 1 constituting the output shaft of the meter. This shaft drives, via a gear train 14, another shaft 21 which runs in bearings 12 and which carries a U-shaped permanent magnet 23 at its end. This magnet forms part of the magnetic drive device 10 and cooperates with the disk 24 chosen preferably as indicated earlier in a non-ferromagnetic material of suitable resistivity to follow the relationship (1) as closely as possible. The disk 24 is mounted near the magnet 23 in the field of this magnet on a shaft 25 coaxial with the shaft 21 and is driven in rotation by the rotating field of this magnet. The shaft 25 is guided by bearings 11.

The disk 24 in turn drives a moving element having another metallic disk 26 and, via a gear train 15, it also drives the totalizing clock mechanism 9. The disk 26 rotates in the gap of two permanent magnets 27, 27' fixed on a wall 16 so as to constitute, with this disk, an eddy-current brake.

Preferably, a crown 28 is provided, for example in soft iron, fixed on a support 29 resting on the magnets 27, 27' and arranged axially, opposite the poles of the rotating magnet 23 so as to channel the lines of force from these poles.

All the elements making up the magnetic drive device and the eddy-current brake are contained in an envelope 17 fixed on the side plate 20, closed by the wall 16 and communicating with the gas to be measured, for example with the output of the meter, through an orifice 40 to allow the entire magnetic drive device and the eddy-current brake to take on the same temperature as that of the gas. The clock mechanism 9 is enclosed in a second envelope 18 fixed on the first and equipped with a glass 19 allowing the the reading of the corrected metering indications. Seals 41 are provided to assure tightness and to prevent any leakage of gas to the outside.

The operation of this device is similar to that which was mentioned in relation to FIG. 2: the shaft 1 drives the magnet 23 at the angular speed $\omega_1$ which, in turn, drives with a slide varying with temperature the shaft 25 of the moving element at the angular $\omega_2$, these two speeds being related by the equation (5) as explained earlier. The clock mechanism 9 displays the corrected metering indications in accordance with temperature, the gas being assumed to have been brought to reference conditions, for example 0°C.

Figure 3:
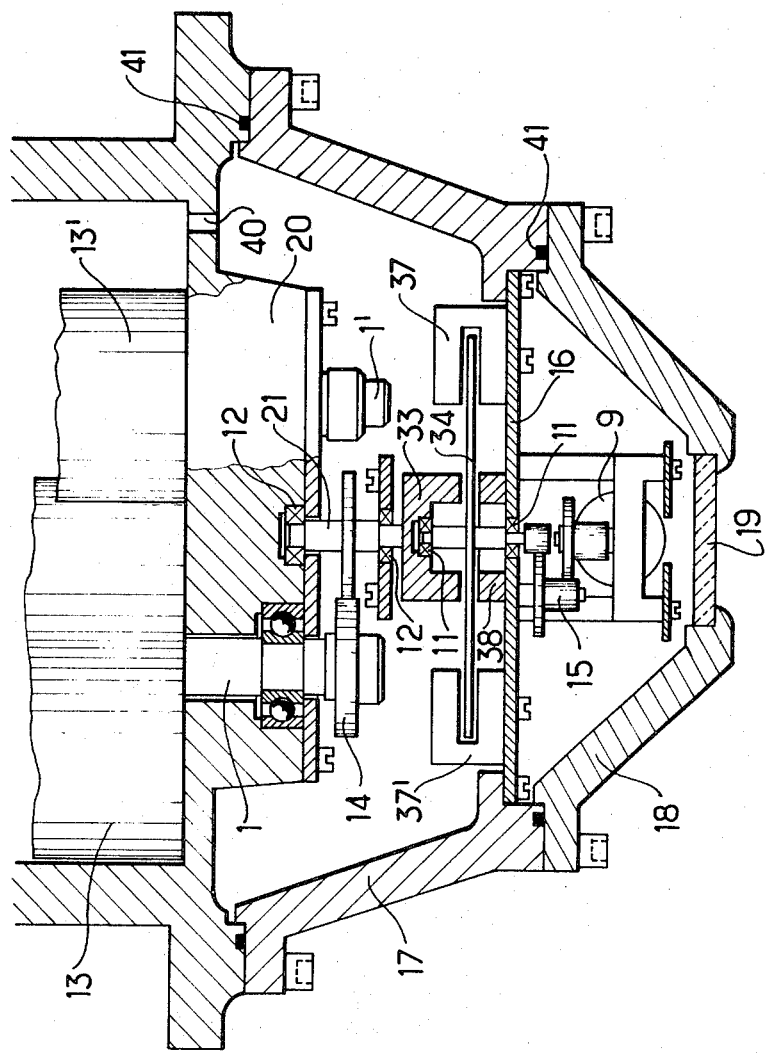

FIG. 3 represents a variant of the preceding device in which the magnetic drive and the eddy-current brake act on the same disk 34. The magnet 33 of the magnetic drive device is rotated by the elements 1, 14, 21 as in the preceding example. The disk 34 passes into the gaps of two magnets 37, 37' of the braking device mounted on the wall 16 as is the crown 38 concentrating the lines of force.

The magnets such as 23, 27, 27', 37, 37' in FIGS. 2 and 3 are of course equipped with thermomagnetic shunts so as to satisfy the formula (5) possibly by acting on the dependence or the independence of the magnetic fluxes as a function of temperature, as indicated in the discussion relative to FIG. 1.

It goes without saying that the invention is not limited to the embodiments described hereinabove, and that modifications are possible without departing from the scope of the invention. Thus, the respective positions of the magnet and of the metallic part of revolution in the form of a disk, bell, etc... of the magnetic drive device can be exchanged, the metallic part then being driven mechanically by the shaft of the meter and the magnet being integral with the moving element driven with sliding. It is also possible to provide several magnets arranged symmetrically with respect to the axis on a rotating support to obtain the magnetic drive.

In order to ensure equal temperature in all cases between the correction device and the gas to be measured, it is possible to provide an insulation for the envelopes 17 and 18 against variations in external temperature.

What is claimed is:

1. Volume meter for producing more accurate representations of the volume flow rate of a metered compressible fluid, comprising a first shaft for rotating at a first speed representative of volume flow rate of the metered fluid, a second shaft, slip connecting means between the first shaft and the second shaft for causing the second shaft to rotate at a second speed functionally related to the first speed, and means for braking the second shaft, the slip connecting means and the braking means being such that the second speed varies in reverse to the temperature of the metered fluid to compensate for any variation of the first speed as a result of a temperature caused density variation of the metered fluid, whereby the second speed provides a representation of the flow rate of the metered fluid which is corrected for variations of density thereof with temperature changes.

2. Volume meter according to claim 1, wherein the slip connecting means comprises at least one rotatable permanent magnet which is mechanically coupled to one of said shafts to create a rotatable magnetic field and a metallic disk which is mechanically coupled to the other of said shafts and is disposed in the magnetic field so that currents may be induced therein upon rotation of said first shaft.

3. Volume meter according to claim 2 wherein the permanent magnet is rigidly secured to the first shaft.

4. Volume meter according to claim 2 wherein the metallic disk has a resistivity whose temperature coefficient is equal to the temperature coefficient of the fluid.

5. Volume meter according to claim 2 wherein the disk is made of a non-ferromagnetic metal.

6. Volume meter according to claim 1 wherein the braking means comprises a permanent magnet and a metallic disk which is secured to the second shaft, a circular portion of the disk rotating between the poles of the permanent magnet.

7. Volume meter according to claim 6 wherein the disk is made of a non-ferromagnetic metal.

8. Volume meter according to claim 1 wherein the braking means and slip connecting means are enclosed in an envelope adapted for communicating with the fluid.

9. A volume meter of a compressible fluid having an output shaft rotating at a speed $\omega_1$ proportional to the volume flow rate of the fluid and further comprising a second shaft rotating at a speed $\omega_2$, magnetic slip connecting means coupling the output shaft to the second shaft, eddy current magnetic means for braking the second shaft, the magnetic slip connecting means comprising first permanent magnet means providing a flux $\phi_1$ secured to one of said shafts and a first non-ferromagnetic metal circular member of resistivity $\rho_1$ which is secured to the other of said shafts and is in magnetic relationship with said first permanent magnet means, the eddy current magnetic means comprising a second non-ferromagnetic metal circular member of resistivity $\rho_2$ and second permanent magnet means of flux $\phi_2$, one of said second circular member and permanent magnet means mounted to said second shaft and movable with respect to the other, the permanent magnet means of the magnetic slip connecting means and of the eddy current magnetic means including one or more thermomagnetic shunts which, in combination with the values of the resistivities $\rho_1$ and $\rho_2$ are chosen such that $(\phi_1/\phi_2)^2(\rho_2/\rho_1)$ varies inversely proportional to the absolute temperature.

10. Volume meter of a compressible fluid having an output shaft for rotating at a first speed representative of the volume flow of the fluid and further comprising a second shaft, magnetic driving means coupling the output shaft to the second shaft to drive the second shaft at a second speed, magnetic means for braking the second shaft, the magnetic and electrical characteristics of said driving and braking means being selected so that the ratio of the second speed to the first speed varies with temperature of the fluid as a reciprocal function of the temperature according to a law which compensates for variation of the density of the fluid with the temperature thereof, whereby the speed of said second shaft may provide a representation of the volume flow of a compressible fluid corrected for variations of fluid density with temperature.

11. Volume meter according to claim 10, wherein the magnetic driving means comprises first permanent magnet means coupled to one of said shafts so as to create a rotatable magnetic field and a first non-ferromagnetic metal circular member coupled to the other of said shafts and in space relationship with said first permanent magnet means so that currents may be induced by the magnetic rotatable field in said first circular member upon rotation of the output shaft, and wherein the magnetic braking means comprises second permanent magnet means and a second non-ferromagnetic metal circular member, one of the second permanent means and of the second circular member being coupled to the second shaft and movably mounted with respect to the other so that the magnetic flux of the second permanent magnet means induces eddy current in the second circular member upon rotation of the second shaft.

12. Volume meter according to claim 11, wherein at least one of the permanent magnet means of the magnetic driving means and of the magnetic braking means includes a thermomagnetic shunt.

13. Volume meter according to claim 12, wherein the ratio of the resistivity of the second circular member to the resistivity of the first circular member varies in inversely proportional relationship with respect to the absolute temperature of the fluid.

14. Volume meter according to claim 11, wherein the first and second circular members are made of the same material.

15. Volume meter according to claim 11, wherein the first and second circular members are separate disks secured to said second shaft.

16. Volume meter according to claim 11, wherein the first and second circular members are respective portions of a single disk.

17. Volume meter according to claim 10 further comprising a first totalizer coupled to the second shaft.

18. Volume meter according to claim 17 further comprising a second totalizer coupled to the output shaft.

19. Volume meter according to claim 11, wherein said first and second permanent magnet means have respective flux $\phi_1$, and $\phi_2$ and said first and second circular members have respective resistivity values $\rho_1$ and $\rho_2$, $\phi_1$ $\phi_2$, $\rho_1$ and $\rho_2$ being selected so that $(\phi_1/\phi_2)^2 (\rho_2/\rho_1)$ is substantially inversely proportional function of the absolute temperature.

* * * * *

UNITED STATES PATENT OFFICE
CERTIFICATE OF CORRECTION

PATENT NO. : 3,868,852
DATED : March 4, 1975
INVENTOR(S) : Sylvain Janssen

It is certified that error appears in the above-identified patent and that said Letters Patent are hereby corrected as shown below:

line 8, change last part of equation to -- $(k_2 < 0)$ --;
    line 30, change "(1 = kt) to -- (1 + kt) --;
    lines 34 and 35, change " $10-3$ " to -- $10^{-3}$ --
    line 44, change formula to read -- $\omega_2 = K\omega_1 \frac{1}{\tau} = K\omega_1 \frac{1}{T}$ Column 5, line 21, change "$(1-4.10^{-3}) \cdot t$" to -- $1 - 4.10^{-3} \cdot t$ --.
Column 6, line 13, before "$\omega_2$" insert -- speed --.

Column 8, line 21, after "permanent" insert -- magnet --.

Signed and Sealed this

Twenty-first Day of September 1976

[SEAL]

Attest:

RUTH C. MASON
*Attesting Officer*

C. MARSHALL DANN
*Commissioner of Patents and Trademarks*